Sept. 24, 1963      D. A. ELLIS      3,104,950
PROCESS FOR THE SEPARATION OF IRON AND TITANIUM VALUES
BY EXTRACTION AND THE SUBSEQUENT PREPARATION OF
ANHYDROUS TITANIUM DIOXIDE
Filed Dec. 11, 1961
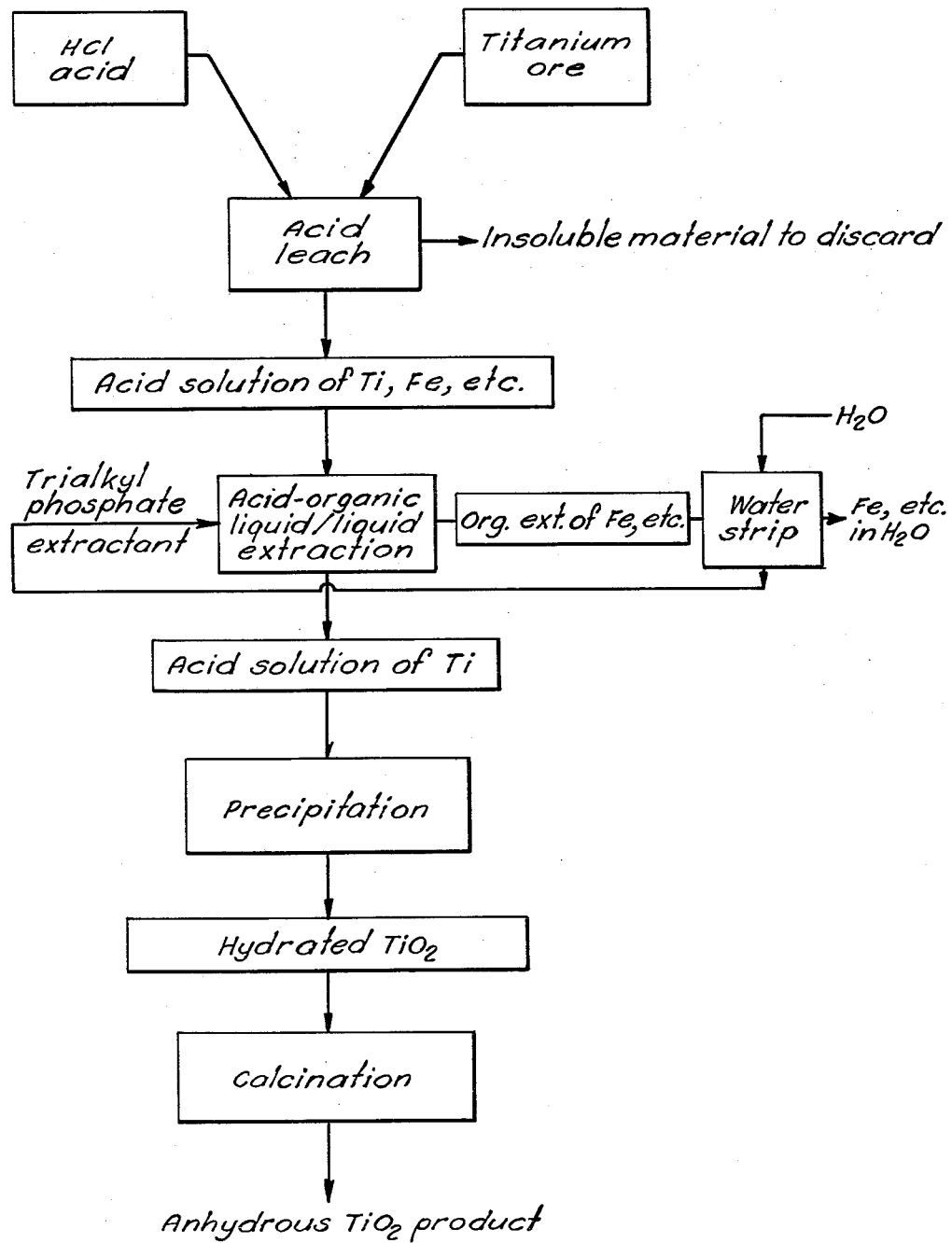
INVENTOR.
David A. Ellis
BY
AGENT

United States Patent Office 3,104,950
Patented Sept. 24, 1963

3,104,950
PROCESS FOR THE SEPARATION OF IRON AND TITANIUM VALUES BY EXTRACTION AND THE SUBSEQUENT PREPARATION OF ANHYDROUS TITANIUM DIOXIDE
David A. Ellis, Concord, Calif., assignor to The Dow Chemical Company, Midland, Mich., a corporation of Delaware
Filed Dec. 11, 1961, Ser. No. 158,484
6 Claims. (Cl. 23—202)

This invention relates to the preparation of titanium dioxide and more particularly is concerned with a process for preparing a high quality titanium dioxide from titanium containing materials not useable in the present processes of $TiO_2$ preparation.

This invention is a continuation-in-part of a copending application Serial No. 87,372, filed February 6, 1961, now abandoned.

The preparation of relatively pure titanium dioxide from high-grade ilmenite ores at present ordinarily is carried out utilizing one of three well developed methods. The method most commonly used involves sulfuric acid digestion of a high-grade ilmenite ore, water leaching of the dissolved metal values, removal of iron from the leachate followed by fractional precipitation of titanium values as the hydrated oxide, and, conversion of the precipitate, by calcination, into the desired anhydrous titanium dioxide. This process has as its chief disadvantage the difficult and expensive problem of iron removal to meet the exacting requirements of a pigment-grade product.

The second method involves direct chlorination of the ore to $TiCl_4$, purification of this product by distillation, hydrolysis of the purified titanium tetrachloride, and calcination of the hydrolyzed product.

The third method of preparation provides for reduction of the ore by roasting with carbon thereby producing $TiO_2$ and sponge iron.

All of these methods suffer from the common disadvantage that a number of titaniferous ores and other titanium containing materials particularly those abundant materials which contain relatively large amounts of iron and manganese such as the low grade ores and blast furnace slags cannot be used therewith.

It is a principal object of the present invention therefore to provide a new and novel method for the production of high-quality, titanium dioxide using titaniferous ores lying between ilmenite and rutile in composition and other titanium containing materials many of which are not processable by the present methods of $TiO_2$ production.

It is an additional object of the present invention to provide a method for the production of an acceptable high grade titanium dioxide wherein both iron and other impurities are readily removed during a processing utilizing relatively few purification steps.

It is another object of the present invention to provide a method for producing substantially pure titanium dioxide wherein high recovery of the titanium values in the ore are achieved.

It is also an object of the present invention to provide a process wherein ease of recycling the extractants and excess of reacting reagents is maintained.

These and other objects and advantages will be apparent from the detailed description presented hereinafter and by reference to the accompanying drawing.

The FIGURE in the drawing presents a schematic flow diagram of a general method of the instant invention for preparing a high-grade titanium dioxide.

The instant process of preparing high grade titanium dioxide, which can be used as a pigment, from titaniferous materials is carried out as follows: (1) the titanium source material is acidulated with hydrochloric acid to dissolve and leach substantially all of the titanium and iron values contained therein; (2) the iron and titanium values are separated by liquid-liquid extraction utilizing an organic extractant which acts preferentially on one or the other of the two species; (3) the titanium values are recovered as precipitated hydrated titanium dioxide, and, (4) the hydrated $TiO_2$ is converted by calcination into a substantially iron-free anhydrous titanium dioxide.

Ordinarily in this process finely divided ores or slags will be used (e.g. 90 percent passing through a 200 mesh U.S. standard sieve) in order to achieve maximum contact of the titanium bearing material with the solubilizing reagents during processing. However, it is to be understood that this choice of ore size particulation is not critical. Furthermore, the choice of titanium source material is not limited, as the instant method is applicable to any of a wide variety of ores lying between ilmenite and rutile in composition and titanium containing slags many of which are not processable to $TiO_2$ by other methods.

The minimum amount of hydrochloric acid to be used in the instant process will be one acid equivalent per acid soluble metal equivalent present in the ore. However, for optimum recovery, several additional moles of acid per mole of metal present are used to bring the titaniferous material into solution. Ordinarily the acid/metal value ratio will range from about 4 to about 1 on an equivalent basis. Any excess acid is not lost during leaching but can be recovered for recycle following the subsequent precipitation of the titanium values therefrom. The effective acid concentration used is from about 6 to about 12 molar. Preferably, to minimize equipment sizes, acid of at least 9 molar will be used and acid of 10 molar or more is preferred.

For most efficient metal dissolution operation, the titaniferous material will be slurried and/or agitated in the acid. However, any conventional leaching techniques can be utilized.

This acidulation is to be performed at a reaction temperature of from about 50 to about 80° C. and desirably will be carried out at from about 60 to about 75° C. At higher temperatures, and particularly near or at the boiling point of the acid premature hydrolysis and precipitation of the titanium values occurs. At temperatures of much less than about 40° C. the reaction kinetics are too low to provide effective dissolution of the titanium values.

As indicated hereinbefore, the rate of dissolution of the titanium and concurrently iron from the ore or slag is dependent to some extent on the particle size of the ore, rate of agitation of slurry, acid concentration, temperature, etc.

Particular reaction times can be selected and controlled for individual operations. However, ordinarily substantially complete acid leaching is achieved at contact times ranging from about several hours up to about several days or more. Ordinarily a contact time of from about 3 to about 12 hours is employed.

Separation of the iron and titanium values contained in the leachate resulting from the acidulation of the ore or slag ordinarily is achieved by solvent extraction. For this operation, organic extractants which preferably strip either one or the other of the metal values from the acidic aqueous solution will be utilized.

Ordinarily, the iron values are removed from the acidic solution using a trialkyl phosphate having alkyl groups containing from about 4 up to about 8 carbon atoms or an alkylamine metal extractant whose alkyl groups range in chain length from about 6 up to about 12 carbon atoms. Specifically, tributylphosphate and triisooctylamine both have been found to give favorable extraction coefficients. However, of these two extractants, tributylphosphate is preferred as it is somewhat difficult to subsequently strip the iron from the amine.

The organic extractant can be used directly to extract the iron values from the acidic phase. However, advantageously this extractant can be carried in a suitable solvent or carrier. The minimum requirements for such a carrier are (1) the solvent be insoluble in the aqueous phases contacted therewith, (2) the extractant be soluble in the solvent, and (3) the extractant iron value extract be soluble in the solvent. Representative excellent carriers are toluene, benzene, other aromatic hydrocarbons, kerosenes, halogenated aromatics and the like.

Useful concentrations of the trialkyl substituted organic extractants in the carrier can range from about 0.3 to about 3.5 molar and preferably will be from about 1.5 to about 3.5 molar.

The relative amounts of the organic extractant solution to the acidic aqueous solution to be utilized can vary from an organic/aqueous phase ratio of from about 1/10 to about 1/1. In any event, the minimum amount of alkyl substituted phosphoric acid extractant to be employed will be the substantially stoichiometric molar equivalent to the moles of iron values to be extracted. Preferably an excess of the organic extractant will be employed.

In actual operation extraction of the iron values into the organic phase is rapid, ordinarily requiring less than five minutes contact and usually taking less than one minute time. The stripping can be carried out in conventional mixer-settlers, counter-current extractors and the like in single or multiple stages.

The titanium values remaining in the substantially iron-free acid leachate after the liquid-liquid extraction are precipitated as the hydrated oxide by simple digestion of this acidic aqueous medium at temperatures ranging from about 80 to about 100° C. Ordinarily, this hydrolysis is completed in from about 30 minutes to about one hour and is greatly accelerated by addition of a base, such as ammonia, aqueous ammonia, caustic and the like to this solution.

Alternatively, if desired, titanium can be extracted preferentially from the original iron and titanium containing leachate using a mono- or dialkyl substituted ortho phosphoric acid extractant. Useful titanium extractants include those materials wherein the number of carbon atoms present in each alkyl group ranges from about 4 to about 18 or more. Preferably, these alkyl groups each will contain at least 8 carbon atoms. Substituted acids which have been found especially effective for titanium extraction, for example, are di(2-ethylhexyl)orthophosphoric acid, monododecyl orthophosphoric acid and monoheptadecyl orthophosphoric acid.

In this alternative method of extraction, substantially all of the titanium along with a small portion of the iron values are extracted into the organic phase. The objectionable iron can be removed from the titanium loaded extract by scrubbing the organic phase with 3 to 12 molar, and preferably 10 to 12 molar, hydrochloric acid. For most practical stripping the phase ratio of the hydrochloric acid to organic extract will range from about 1/1 to about 1/10 on a volume basis.

The same reaction conditions, extraction techniques and extractant diluents as used in the iron extraction process can also be followed in this alternative method of separating the titanium and iron values.

Stripping of the titanium from the substantially iron-free organic based extract after separation of this phase from the hydrochloric acid iron containing leachate is accomplished by adding to this titanium loaded extract an aqueous solution the solute of which is a member selected from the group consisting of (1) alkali metal hydroxides, (e.g. sodium hydroxide, potassium hydroxide, cesium hydroxide and rubidium hydroxide), (2) ammonium hydroxide, (3) the carbonate salts of the cations of preceding groups (1) and (2), (4) mixtures of ammonium hydroxide and ammonium carbonate, (5) hydrogen fluoride, and (6) acidic ammonium and alkali metal fluorides (e.g. ammonium bifluoride, hydrogen fluoride, ammonium fluoride, sodium fluoride, potassium bifluoride, cesium fluoride and rubidium fluoride).

Hydrated titanium oxide is precipitated from the basic stripping solutions while the corresponding double fluoride, e.g. $(NH_4)_2TiF_6$, will precipitate from the acidic fluoride solutions when the solubility of the double fluoride in the aqueous phase is exceeded.

Stripping solutions having a minimum concentration of about 0.1 mole of the base or salt per liter are operable. Preferably solutions greater than 1 molar will be used as a practical matter.

The amount of the basic stripping solution to be utilized will be that amount which contains at least two moles and preferably four moles of the solute per mole of titanium present. With the acidic fluoride stripping solutions, the solution should contain at least four moles and preferably six moles of solute per mole of titanium present in the organic phase. For example, an amount of substantially saturated solution of ammonium carbonate equivalent to about 4 moles of the carbonate per mole of titanium preferably will be used to strip titanium contained in a 2(di-ethylhexyl)orthophosphoric acid extract. With this basic strip solution, the aqueous and organic phases form two layers which are easily separable. Upon further standing the titanium values readily precipitate from the aqueous phase. Alternatively, if desired, the precipitation of the titanium values in the basic solution can be facilitated by heating to bring about gentle evaporation of the water from this aqueous phase.

Ammonium bifluoride also, when used in a slight equivalent molar excess was found to satisfactorily strip titanium from both the mono- and dialkyl phosphoric acids. Dilute bifluoride solutions removed the titanium in a soluble form while concentrated solutions, containing about 35 percent or more $NH_4HF_2$ on a weight basis, gave substantially immediate precipitation of the corresponding $(NH_4)_2TiF_6$. Precipitation of the titanium values as the fluoride necessitates conversion of this material to the hydrated titanium oxide by reaction with a base, preferably ammonia or aqueous ammonia prior to conversion into the anhydrous oxide. The resulting ammonium fluoride solution obtained as a by-product of this conversion may be heated to remove a portion of the ammonia and the residual neutral or acidic fluoride solution then be recycled for use in further stripping operations.

The so-recovered hydrated titanium dioxide product obtained from either of the hereinbefore described methods of extraction and separation is converted into the desired anhydrous oxide by calcination at temperatures above about 800° C. and preferably at from about 800 to about 1000° C. for a minimum period of three hours. This anhydrous titanium dioxide was found by spectrographic analysis to be a high grade material.

The following examples will serve to further illustrate the invention, but are not meant to limit it thereto.

*Example 1*

Fifty grams of an Ione ilmenite ore (Fe=12.1 percent, Mn=0.1 percent and Ti=23.4 percent) was ground until 95 percent passed through a 200 mesh U.S. standard sieve. This ore was treated with 4 moles excess, based on the stoichiometric equivalent of acid soluble metal values in the ore acid ratio, of 9 molar hydrochloric acid in a beaker under controlled conditions whereby a maximum temperature of 80° C. was not exceeded. The initial acid-ore slurry was agitated for about 3 hours. After this time, a small amount of insoluble residue remained. Analysis of the acidic leachate showed a titanium concentration of about 50 grams/liter expressed as $TiO_2$ and an iron concentration of 38 grams/liter expressed as Fe, and a residual acid strength of 5 molar hydrochloric acid.

The acidic extract was mixed with 600 milliliters of a solution of 50 volume percent tributylphosphate in toluene (1.9 molar) and this mixture then was shaken for ten minutes. After this time, the organic and aqueous acidic layers were allowed to separate and the organic upper layer was decanted from the two phase system.

Analysis of the aqueous acidic phase showed about 50 grams/liter titanium and less than 0.01 gram/liter iron. Water stripping the iron from the organic extract with 600 milliliters of water gave an aqueous phase containing about 38 grams/liter iron and less than 0.01 gram/liter titanium. A second 600 milliliter water wash of the tributyl phosphate solution was found to extract only a very small amount of additional iron (equivalent to less than .006 gram/liter of water). The so-stripped organic extractant now was in condition for reuse.

The acidic aqueous phase from which substantially all of the iron had been removed was warmed to about 90° on a steam bath, held at this temperature for about 30 minutes and then allowed to cool to room temperature. The resulting precipitated hydrous titanium oxide was collected by filtration and calcined at about 900° C. for about 3 hours. About 30 grams titanium was recovered as the oxide rutile. This product had an analysis of impurities as follows: Al 0.001 percent, Cu 0.002 percent, Fe 0.001 percent, Si .01 percent, V 0.01 percent.

*Example 2*

The same type of ore and general processing technique was employed as described for Example 1, except that 2 moles excess, based on the stoichiometric equivalent metal value in the ore-acid ratio, of 12 molar hydrochloric acid was employed as the acidulating agent. The original acidic leachate showed a titanium concentration of about 35 grams/liter expressed as $TiO_2$, an iron concentration of about 38 grams/liter expressed as Fe and a residual acid strength of about 9.5 molar hydrochloric acid. Subsequent treatment of this leachate, following the procedure as set forth in Example 1 gave a rutile titanium dioxide product similar in composition to that produced in this latter example.

*Example 3*

Six molar hydrochloric acid was employed using 3 moles excess, based on the stoichiometric equivalent metal values in the ore-acid ratio, in another run employing the process steps and titaniferous ore set forth in Example 1. The resulting leachate contained dissolved titanium values of about 24 grams/liter (expressed as $TiO_2$), about 16 grams/liter Fe and showed residual hydrochloric acid concentration of about 4 molar.

The final $TiO_2$ product obtained from subsequent processing according to the procedural steps of Example 1 also was of the same degree purity as shown by the product of Example 1.

In a manner similar to that described for the foregoing examples a 100 gram sample of a —100 mesh domestic ilmenite, assaying 31.8 percent Ti, 23.1 percent Fe and 0.1 percent Mn was subjected to counter-current extraction by 10 molar hydrochloric acid using an amount of acid equal to about 2 times the iron and titanium metal equivalents present in the cake.

The resulting acidic aqueous leachate was treated with about an equal volume of a 20 percent solution of triisooctyl amine in benzene, thereby extracting substantially all of the iron therefrom.

To the resulting substantially iron-free acidic leachate was added a small amount of aqueous ammonia. The solution was heated to about 100° C. and maintained at this temperature for about 1 hour. After this time, the solution was cooled and the precipitated hydrated titanium oxide was removed by filtration. This product was calcined at about 800° C. for about 4 hours and gave a product of substantially the same quality as was obtained in Example 1.

An off-grade titaniferous ore can be treated with about 6 molar hydrochloric acid, using about 1.5 mole equivalents of acid for each mole of metal values present. The titanium can be extracted from the acidic solution using di(2-ethylhexyl)orthophosphoric acid and the titanium values recovered by stripping this extract with a substantially saturated solution of ammonium carbonate. Hydrated titanium oxide can be precipitated from this aqueous carbonate solution and this product calcined to give a pigment-grade titanium dioxide.

Additionally a 10 mesh titaniferous blast furnace slag can be extracted with about 12 molar hydrochloric acid using about an equivalent quantity of acid for the metal values present. The resulting extract can be agitated with a 10 percent solution monododecyl orthophosphate dissolved in kerosene to strip titanium therefrom. The titanium can be recovered from the organic extractant by stripping with dilute ammonium bifluoride solution. The resulting precipitated titanium-ammonium double fluoride can be converted to the titanium hydrated oxide by treatment with aqueous ammonia, and this oxide in turn can be calcined at about 1000° C. for about 3 hours to produce a high-grade anhydrous titanium dioxide.

Various modifications can be made in the process of the present invention without departing from the spirit or scope thereof for it is understood that I limit myself only as defined in the appended claims.

I claim:
1. A process for the preparation of anhydrous titanium dioxide which comprises:
   (1) dissolving in hydrochloric acid at a temperature of from about 40 to about 80° C. a titaniferous material, said hydrochloric acid initially ranging from about 6 to about 12 molar and the mole ratio of said acid to the acid soluble metal values in said ore ranging from about 1 to 4 on an equivalent basis,
   (2) contacting the acid leachate with at least a stoichiometric molar equivalent of a member selected from the group consisting of trialkyl phosphates and alkyl amines, monoalkyl phosphates and dialkyl phosphates, the alkyl groups of said trialkyl phosphates containing from about 4 up to about 8 carbon atoms, the alkyl groups of said alkyl amines containing from about 6 up to about 12 carbon atoms and the alkyl groups of said mono- and dialkyl phosphates containing from about 4 to about 18 carbon atoms, said trialkyl phosphates and alkyl amines preferentially extracting dissolved iron values from said acid leachate and said mono- and dialkyl phosphates preferentially extracting dissolved titanium species from said acid leachate,
   (3) separating the acid aqueous and organic phases,
   (4) recovering the titanium values as the hydrated oxide, and
   (5) calcining said hydrated oxide thereby converting it into a substantially iron free, anhydrous titanium dioxide.

2. A process for the preparation of anhydrous titanium dioxide which comprises:
   (1) dissolving at a maximum temperature of about 80° C. a particulate titaniferous material with hydrochloric acid, the concentration of said acid ranging from about 9 to 12 molar and the amount of said acid being at least stoichiometrically equivalent to the total amount of iron and titanium present in said ore;
   (2) stripping the iron from the resulting acidic solution with at least a stoichiometric molar equivalent of a member selected from the group consisting of trialkyl phosphate and alkylamines, the alkyl groups of said trialkyl phosphate containing from about 4 to about 8 carbon atoms and the alkyl groups of said alkylamines containing from about 6 to about 12 carbon atoms;

(3) heating the substantially iron-free aqueous acidic solution from about 80 to about 100° C. thereby to precipitate hydrated titanium oxide;
(4) separating said precipitated hydrated titanium oxide from said solution; and
(5) calcining at from about 800° to about 1000° C. said hydrated titanium oxide for at least 3 hours thereby to produce anhydrous titanium dioxide.

3. A process for the preparation of anhydrous titanium dioxide which comprises:
  (1) dissolving a titaniferous material at a temperature of about 60° to about 75° C. with hydrochloric acid ranging in concentration from about 6 to about 12 molar and the amount of said acid used being at least a 2 molar excess, as based on acid equivalents of the total of the titanium and iron values in said ore;
  (2) stripping the iron from the resulting acidic solution with at least a stoichiometric quantity of tributylphosphate, said tributylphosphate being carried in toluene;
  (3) separating the iron-loaded organic extract from the substantially iron-free acid leach;
  (4) heating said acid leach from about 80° to about 100° C. for a period of from about 30 minutes to about 1 hour precipitating hydrated titanium oxide thereby;
  (5) separating said precipitated hydrated titanium oxide from said solution;
  (6) calcining said hydrated titanium oxide at a temperature from about 800° C. to about 1000° C. for a period of about 3 hours thereby preparing anhydrous titanium dioxide.

4. The process as defined in claim 3 and including the step of adding a small amount of a base to the substantially iron-free acidic solution prior to heating.

5. A process for separating dissolved titanium and iron values contained in a hydrochloric acid solution which comprises, contacting said solution with at least a stoichiometric molar equivalent of a member selected from the group consisting of trialkyl phosphate and alkylamines thereby to extract substantially all of the iron values from said hydrochloric acid solution into the organic extractant, the alkyl groups of said trialkyl phosphate containing from about 4 to about 8 carbon atoms and the alkyl groups of said alkylamines containing from about 6 to about 12 carbon atoms.

6. The process as defined in claim 5 and including the step of separating the substantially iron-free titanium containing acid solution from the iron loaded organic extract.

References Cited in the file of this patent
UNITED STATES PATENTS

| | | |
|---|---|---|
| 1,106,409 | Rossi et al. | Aug. 11, 1914 |
| 1,728,296 | Marshall | Sept. 17, 1929 |
| 1,929,521 | Ryan et al. | Oct. 10, 1933 |
| 2,804,375 | Kamlet | Aug. 27, 1957 |
| 2,974,014 | Hoekje | Mar. 7, 1961 |